United States Patent [19]
Le Comte

[11] Patent Number: 5,304,339
[45] Date of Patent: Apr. 19, 1994

[54] METHOD FOR MANUFACTURING A LARGE-SIZED OBJECT OF FIBER REINFORCED SYNTHETIC RESIN

[76] Inventor: Adolf Le Comte, 101 Harbor La. West, New Rochelle, N.Y. 10805

[21] Appl. No.: 804,759

[22] Filed: Dec. 11, 1991

Related U.S. Application Data

[63] Continuation-in-part of Ser. No. 527,450, May 23, 1990, Pat. No. 5,096,651.

[51] Int. Cl.⁵ .............................. B29C 43/20
[52] U.S. Cl. ............................ 264/511; 264/102; 264/257; 264/258; 264/314
[58] Field of Search ............ 264/313, 314, 45.2, 264/102, 510, 511, 257, 258

[56] References Cited

U.S. PATENT DOCUMENTS

| | | | |
|---|---|---|---|
| 3,344,007 | 9/1967 | Skoggard | 264/314 |
| 3,490,978 | 1/1970 | Shockey et al. | 264/331.19 |
| 4,267,147 | 5/1981 | Pogoda et al. | 264/571 |
| 4,359,437 | 11/1982 | le Comte | 264/102 |
| 4,476,075 | 10/1984 | Brinkmann et al. | 264/245 |
| 4,483,669 | 11/1984 | Hahn et al. | 264/171 |
| 4,660,498 | 4/1987 | Madison | 264/511 |
| 4,950,354 | 8/1990 | Schirmer | 156/293 |
| 5,023,042 | 6/1991 | Efferding | 269/571 |
| 5,096,651 | 3/1992 | le Comte | 264/510 |
| 5,123,985 | 6/1992 | Evans et al. | 156/285 |

FOREIGN PATENT DOCUMENTS 1263013  10/1989  Japan .................. 264/511

*Primary Examiner*—Allan R. Kuhns
*Attorney, Agent, or Firm*—Griffin, Butler, Whisenhunt & Kurtossy

[57] ABSTRACT

A method of manufacturing a large-sized, thin-walled, elongated molding of fiber reinforced, hardenable synthetic resin where at least one layer of reinforcing fiber is laid against a form-retaining, rigid inner mold part, a flexible outer mold part is placed against the fiber layer, a liquid, hardenable synthetic resin is flowed into the mold cavity through openings in the mold parts to substantially fill the mold cavity, and a reduced pressure is induced within the mold cavity to cause the flexible outer mold part to be tightly drawn against the fiber layer and toward the inner mold part, air to be removed from within the resin, mold cavity and fiber layer and to cause the resin to flow into the fiber layer and mold cavity, whereby a high fiber-to-resin content molding is produced. The reduced pressure is maintained until the resin has sufficiently hardened as to be shape sustaining. Multi-channeled cores may be placed in the so-formed mold cavity to improve the uniformity of resin distribution.

29 Claims, 3 Drawing Sheets

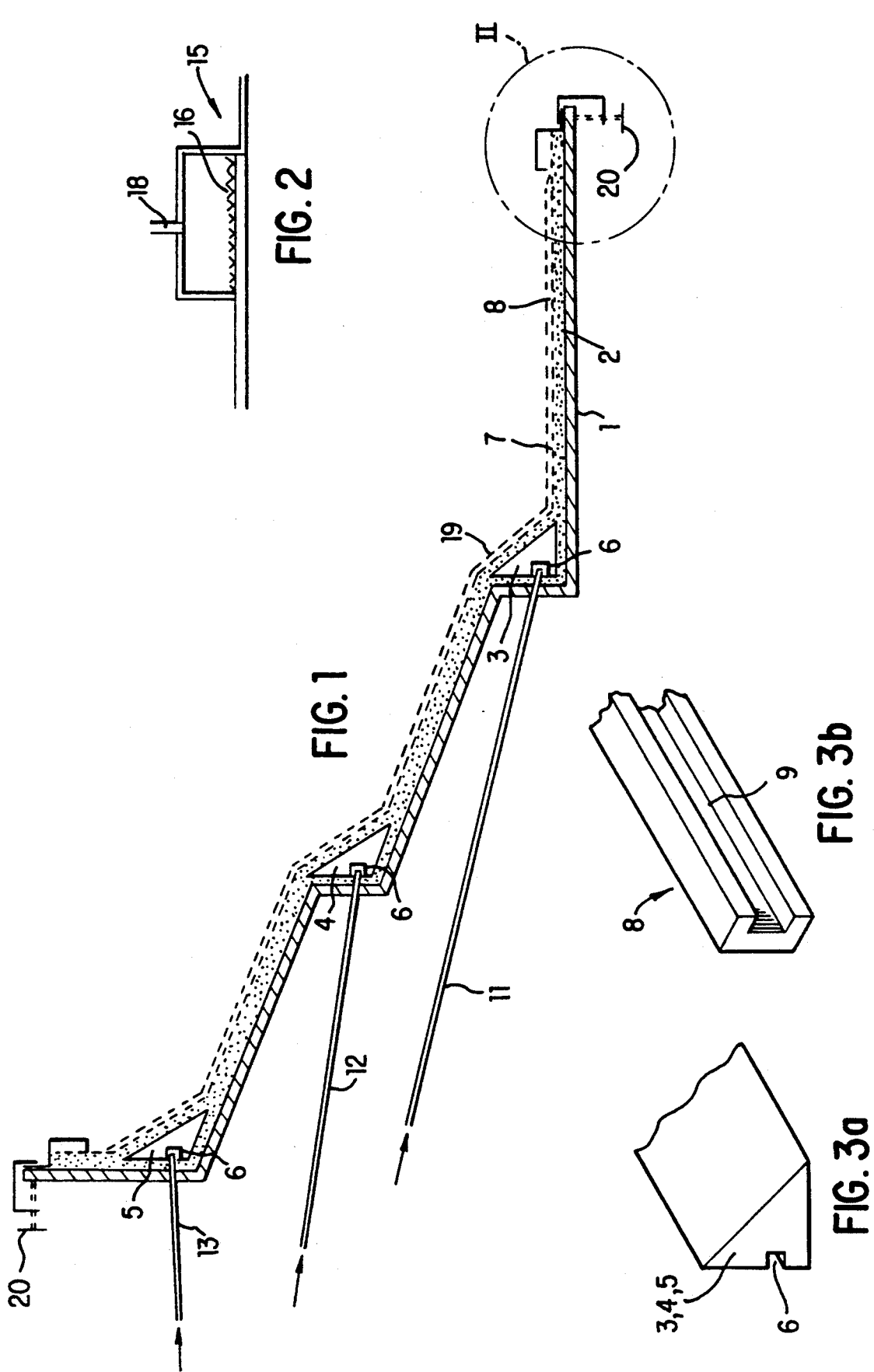

METHOD FOR MANUFACTURING A LARGE-SIZED OBJECT OF FIBER REINFORCED SYNTHETIC RESIN

This application is a continuation-in-part of copending application Ser. No. 07/527,450, filed on May 23, 1990 now U.S. Pat. No. 5,096,651.

BACKGROUND OF THE INVENTION

The present invention relates to a method of manufacturing a large-sized, thin-walled, elongated object, i.e. a molding, of fiber reinforced, hardenable synthetic resin. The invention more particularly relates to such a method for the manufacture of a molding which is of such large size that the molding cannot be carried out by conventional injection molding machines, blow molding machines, vacuum molding machines, and the like, but must be carried out by human labor placing reinforcing fibers against a mold surface, with subsequent closing of the mold and flowing hardenable resin therethrough. Such large-sized moldings include boat hulls, windmill rotor blades, motor coach bodies, and the like.

In the prior art, moldings of this nature were carried out by laying at least one layer of reinforcing fibers against a form-retaining, rigid inner mold part, such that the layer is substantially co-extensive with the inner mold part. That laying of the fiber layer against the inner mold part (which may actually consist of a plurality of layers of fibers) is, usually, done by human hands. The layer is normally substantially coextensive with the inner mold part, although in this regard, for special moldings that fiber layer need not be completely coextensive with the inner mold part. For example, the inner fiber layer may have openings which are intended to become, for example, passageways in a boat or motor coach housing, or equipment openings or portholes and the like. Nevertheless, in the more usual sense, the fiber layer is substantially coextensive with the inner mold part.

After the fiber layer is laid against the inner mold part, a form-retaining, rigid outer mold part is placed against the fiber layer so as to form a mold cavity between those two mold parts. Usually, the inner mold part is in the general form of a female mold part and the outer mold part is generally in the form of a male mold part, although for certain moldings, the reverse may be true. In any event, the two form-retaining, rigid mold parts form a mold cavity with the fiber layer disposed within that mold cavity.

Thereafter, a liquid, hardenable synthetic resin is flowed into the mold cavity through one or more openings in at least one of the mold parts, to at least substantially fill the mold cavity, and usually entirely fill the mold cavity. In this regard, there are a number of techniques for filling the mold cavity with the synthetic resin which have been used in the art. For example, some of those techniques include flowing the resin through the mold cavity in such a volume so as to exceed the volume of the mold cavity, so that some resin overflows the mold cavity and, consequently, carries some entrapped air within the fiber layer and mold cavity out of the mold cavity. However, in all of the techniques, the mold cavity is at least substantially filled with the synthetic resin.

The general technique of filling the mold cavity is that of flowing the synthetic resin through one or more openings in at least one of the mold parts. The openings may be in the inner mold part or the outer mold part or they may be in the juncture between the two mold parts. Also, more usually, there is at least one opening at a lower part of the mold, so that the resin flows upwardly through the mold and through the fiber layer, and, consequently, will remove more air trapped within the mold cavity and fiber layer as the resin moves through the mold cavity.

As noted above, the general methods in the art for filling the mold cavity have, as a purpose, the removal of some of the air trapped within the mold cavity and the fiber layer. However, that flow of resin, even an upwardly flow of resin, is not sufficient to remove all, or even most, of the air trapped in the mold cavity and fiber layer, and the art, generally, attempts to remove further air from the mold cavity and fiber layer by inducing a reduced pressure within the mold cavity. This reduced pressure will pull trapped air from the mold cavity and the fiber layer out of the mold cavity. It is, of course, well recognized in the art that it is imperative to remove as much of the trapped air as possible from the mold cavity and fiber layer, since any air trapped in the molding itself will constitute voids, and large voids or a concentration of voids may cause potential weak spots in the molding.

To achieve the reduce pressure, at least one vent is placed in at least one of the mold parts and is connected to a vacuum source sufficient to remove air from within the mold cavity and the fiber layer. This reduced pressure will also remove some of the air trapped in the resin flowing in the mold. In this regard, as the resin is flowed through the mold cavity, the liquid resin has a tendency to entrain air, and the reduced pressure will pull some of that entrained air from the resin, as well as from the mold cavity and the fiber layer. The vent or vents may be in either the mold parts, or formed at a juncture between the mold parts (constituting a vent, in part, in each of the mold parts) and at least one or more vents is generally placed at an upper portion of the mold cavity, so as to more efficiently remove air from the mold cavity, fiber layer and resin.

The vacuum source which achieves the reduced pressure in the mold cavity is, generally, not a relative high vacuum source. As can be appreciated, both the inner and outer mold parts are form-retaining, rigid mold parts, in order to provide the mold definition required for the molding. Since the surface area of the two mold parts is quite large for such large-sized moldings, high vacuum sources and high reduced pressure cannot be tolerated. Otherwise, one or both of the mold parts would deform under the reduced pressure, and, thus, disrupt the required mold definition.

After the mold cavity has been filled with resin, and the reduced pressure within the mold cavity withdraws such air as is capable of being withdrawn, the reduced pressure is continued, and the filled mold is left at rest, for solidification of the hardenable resin. In this regard, typical resins are epoxy resins, polyester resins, and vinylester resins. Other hardenable resins may be used, depending upon the particular molding involved, but the foregoing are the more normal resins used in such large size moldings.

While resins that cure at elevated temperatures may be used, e.g. up to temperatures up to and in excess of 100° C., these resins are more difficult to use, since the resin must be cured with added heat, e.g. large ovens or heat lamps. Therefore, more usually, these resins are room-temperature cure resins, which is usually defined as curable at a temperature between about 15° C. and 30° C. It is preferred that the liquid resin be a room-temperature cure resin, since moldings of this large size are often performed in the outside ambient weather or performed in large buildings where only about room temperature, e.g. 15° to 30° C., can be maintained.

The time for solidifying the resin, i.e. initially curing the resin, can vary with the particular resin, the catalyst used, and the ambient or heated temperature, but generally speaking the initial curing time is at least an hour, and more usually four to six hours, but may extend for longer times. For many resins, with particular catalyst, in order for the resin to completely cure, some days are required, but after the initial curing, i.e. solidification, of the resin, at least the inner mold part may be removed.

As can be appreciated from the prior art method of molding such large, thin-walled moldings, such as boat hulls and the like, it is necessary to have two form-retaining, rigid mold parts, i.e. the inner mold part and the outer mold part. The contours of these two mold parts must be complementary in order to achieve the required mold definition therebetween. Since these mold parts are quite large, it is also obvious that the cost of manufacturing these mold parts is also quite high. Further, since the mold definition between the two mold parts depends upon the retaining of the contours of these rigid mold parts, the degree of reduced pressure in the mold cavity should be carefully controlled, since an inappropriate reduced pressure could cause one or both of the mold parts to buckle and spoil the required mold definition. With low reduced pressures, it is difficult to remove all or most of the air from the mold cavity, fiber layer and resin, and often quite undesired voids in the molding results from the trapped air, and these voids, in some cases, may constitute potential weak portions of the molding, while with high reduced pressures buckling of a mold part may result.

Further, since two rigid mold parts are used, there is no possibility of compressing the fiber layer therebetween. This results in relatively low fiber-to-resin ratios, e.g. 3.5 to 4.5 fiber/6.5 to 5.5 resin. Most of the strength of the molding is from the fiber, and, hence, the lower ratios result in lower strengths of the molding.

In the above-noted parent application, the entire disclosure of which is incorporated herein by reference and relied upon for disclosure, there is disclosed a method of manufacturing such large-sized thin-walled, elongated moldings wherein the outer mold part is a non-form-retaining, flexible outer mold part, e.g. a flexible sheet or film made of plastic. When such flexible outer mold part is used, the reduced pressure tightly draws that flexible outer mold part against the fiber layer, and therefore the fiber layer functions to provide the required mold definition between the inner mold part and the outer mold part. This also compresses the fiber and results in a much higher fiber/resin ratio. With this arrangement, careful control of the reduced pressure is not required.

That application also discloses elongated cores which extends in the longitudinal direction of the molding. The cores have at least one resin supply duct extending in the longitudinal direction of the core, which duct functions to allow the liquid resin to flow therethrough and distribute that resin in the fiber layer, while the flexible outer mold part is tightly pulled against the fiber layer and toward the inner mold by means of the reduced pressure.

That application also discloses the disposing of a plurality of strips having longitudinal passageways in a direction substantially transverse to the direction of the cores such that the strips will further cause distribution of the resin from the cores and into the fiber layer.

Thus, the molding process described in the parent application is a substantial advance in the art of manufacturing such large-sized, thin-walled, elongated moldings. In one aspect of the present invention, it has been found, however, that the cores and strips described in the parent application do not distribute the resin in the fiber layer to the uniformity that would be desired. Thus, in this aspect of the present invention, a method is provided for more uniformly distributing the resin in the fiber layer.

BRIEF DESCRIPTION ON OF THE INVENTION

In the broadest aspect of the present invention, as disclosed in the parent application, the present invention is directed to a method of manufacturing a large-sized, thin-walled, elongated molding of fiber reinforced, hardenable synthetic resin. The present invention is an improvement over the prior art process wherein at least one layer of reinforcing fibers is laid against a form-retaining, rigid inner mold part such that the layer is substantially co-extensive with the inner mold part. An outer mold part is placed against the fiber layer so as to form a mold cavity between the mold parts, with the fiber layer disposed within the so formed mold cavity. A liquid, hardenable synthetic resin is flowed into the mold cavity through one or more openings in at least one of the mold part to at least substantially fill the mold cavity. A reduced pressure is induced within the mold cavity by means of at least one vent in at least one of the mold parts being connected to a vacuum source sufficient to remove air from within the resin, the mold cavity and the fiber layer. This prior art process is described in detail above.

The present improvement is that of placing a non-form-retaining, flexible outer mold part against that fiber layer. A liquid, hardenable resin is then flowed into the mold cavity. The vents are connected to a vacuum source sufficient to cause the flexible outer mold part to be tightly drawn against the fiber layer and toward the inner mold part, air to be removed from the resin, mold cavity and fiber layer, wherein the resin is caused to flow into the fiber layer and the mold cavity and a higher fiber-to-resin content molding is produced. The mold cavity is substantially filled with the resin and thereafter the flow of resin is stopped. The vacuum source producing the reduced pressure in the mold cavity is maintained until the resin has sufficiently hardened as to be shape-sustaining. Thereafter, the vacuum may be discontinued, and the molding may be allowed to further cure.

In another aspect of the invention, in order to provide further improved uniformity of flow of resin through the fiber layer, in the above described method, at least one multi-channeled elongated core is applied to a fiber layer, with the core extending at least along substantially the entire length of a longitudinal direction of the molding. The core has a plurality of interconnected channels on least one side thereof, such that resin flowing in the channels flows in substantially both the longitudinal and transverse directions of the core. This provides improved uniformity of distribution of the resin in the mold cavity and the fiber layer, and hence a more uniformed strength of the resulting molding.

BRIEF DESCRIPTION OF THE DRAWINGS

FIG. 1 is a schematic cross-section of a mold for forming a boat hull, with the longitudinal direction of the hull being transverse to the plane of the drawing;

FIG. 2 is a detailed drawing, on an enlarged scale, of a portion of FIG. 1;

FIG. 3A is a perspective view of a core for use in the molding;

FIG. 3B is a perspective view of a strip which may be used in the molding;

DETAILED DESCRIPTION OF THE INVENTION

Figure 4:
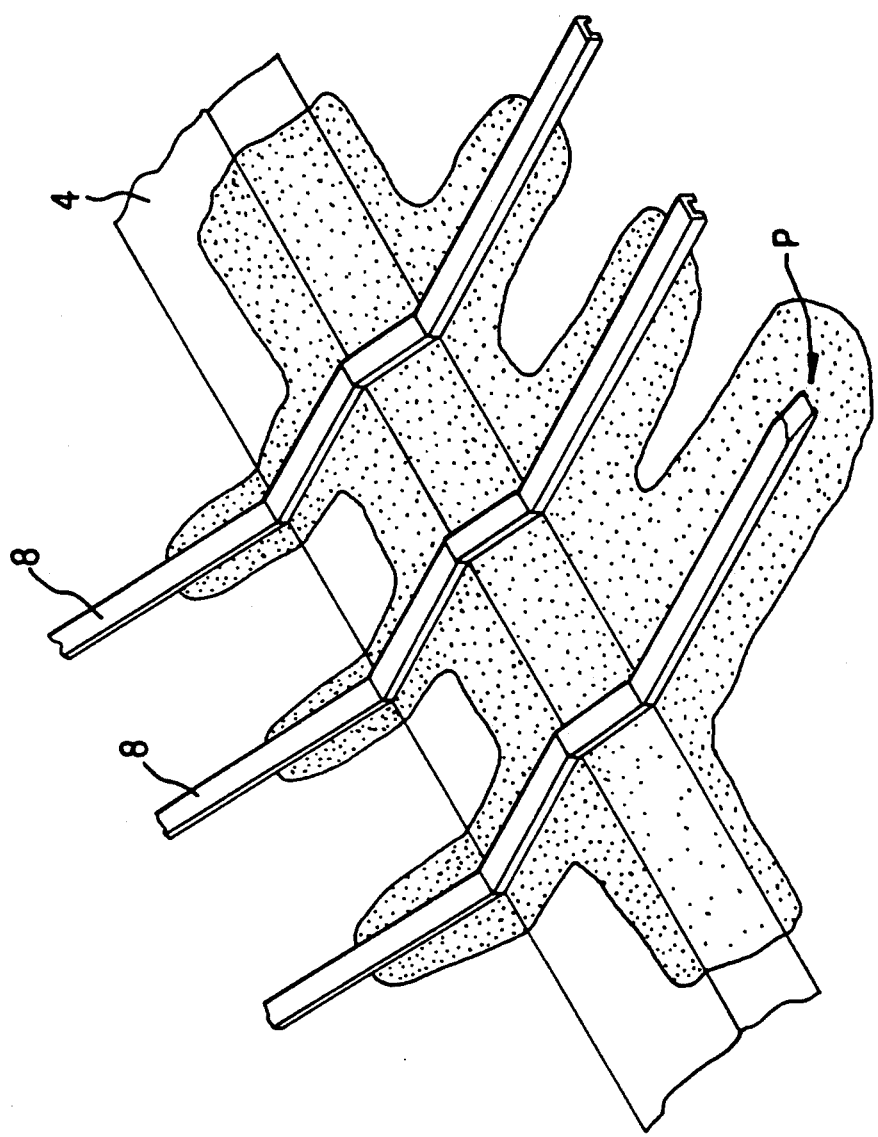
FIG. 4 shows a perspective view of the application of a core and strips in the molding.

Referring to FIG. 1, and in connection with the broader aspect of the invention, an inner mold part 1 is configured in the desired shape of the molding, a boat hull being shown in FIG. 1. It will be seen that the cross-sectional view of FIG. 1 shows the configuration of inner mold 1 in a typical boat hull stepped configuration. The longitudinal direction of the boat hull and, accordingly, inner mold 1 is typically from 3 to 100 meters, and very often from 6 to 40 meters, and it can be appreciated that these are very large-sized, thin-walled, elongated moldings. At least one layer of reinforcing fibers 2 is laid against the form retaining, rigid inner mold part 1 such that the fiber layer is substantially coextensive with the inner mold part, as explained above. Also, as explained above, fiber layer 2 may be hand laid against the upper surface of the inner mold part 1 and, in this case, the fiber layer is usually at least in part, and more usually totally, a non-woven mat of fibers, woven roving of fibers, uni-directional roving of fibers, or uni-directional roving and blown non-woven layer of fibers or any combinations thereof. However, depending upon the molding, the fiber layer may be at least in part a woven fabric of fibers. Boat hulls, for example, may have the fiber layer composed of non-woven mats of fibers or rovings of fibers or woven fabrics of fibers or combinations thereof. On the other hand, for example, a windmill rotor blade may, for example, have the fiber layer only of a woven fabric of fibers or in combination with rovings of fibers.

Whether only one fiber layer or a plurality of fiber layers is used for the molding, the fiber layer in the uncompressed form (before any compression by virtue of the reduced pressure in the mold cavity) can vary widely, i.e. from as little as 1 mm or 2 cm up to 3 or 5 cm or more.

Alternatively, rather than using a mat or roving or fabric of fibers, chopped fibers may be placed against the top surface of inner mold part 1, in a manner conventional in the art, to produce the fiber layer 2. Also combinations of non-woven mats or rovings of fibers and woven fabrics of fibers may be used, depending upon the particular molding intended.

It will be appreciated, however, that by virtue of any of the techniques described above for applying fiber layer 2, substantial amount of air will be trapped within fiber layer 2, and, as noted above, it is important to remove as much air from fiber layer 2 as possible during the molding process.

Also as noted above, the fiber layer is generally substantially coextensive with the inner mold part, i.e. the upper surface of inner mold part 1, although the fiber layers need not be totally coextensive with the inner mold part, and can have openings for passageways in the hull, portholes in the hull, fitting apertures in the hull, and the like. Nonetheless, the fiber layer is generally substantially coextensive with the inner mold part 1.

The fibers of the fiber layer may be chosen from a wide variety of fibers, as is the general practice in the art. The fibers may be organic fibers or inorganic fibers, or even natural fibers, including cotton and hemp, but generally, and usually preferred, the fibers are glass fibers or plastic fibers, e.g. aramid fibers, or carbon fibers, all of which is well known in the art and need not be described herein in any detail.

The foregoing is the general practice in the art, and at this point of the process, the present improvement is introduced. After fiber layer 2 is placed on inner mold part 1, instead of using a form-retaining, rigid outer mold part, as was used in the prior art, in the present process a non-form-retaining, flexible outer mold part 19 is placed against the fiber layer 2. The outer mold part 19 may be a flexible sheet or film (foil). That flexible sheet or film may be made of plastic material, e.g. stretchable plastic material. However, since it must be capable of retaining the reduced pressure used in the present process, that sheet or film must be substantially air impermeable, so that a vacuum can be drawn between inner mold part 1 and outer mold part 19 and that vacuum can be sustained without pulling substantial amounts of air through outer mold part 19. In this regard, since inner mold part 1 is a form-retaining rigid part, made of a rigid material such as metal, e.g. steel, wood, reinforced plastic, ceramics and the like, that inner mold part 1 will be air impermeable.

A wide variety of films or sheets may be used for outer mold part 19, e.g. polyester films, olefin films (polyethylene and polypropylene) and vinyl films. It is only necessary that inner mold part 19 be sufficiently flexible so as to be tightly drawn against the fiber layer 2 when the vacuum source is connected to the mold cavity. Thus, depending on the particular material, the sheet or film may be from as little as 0.003 to 0.006 cm thick to as thick as 0.03 to 0.06 cm or even more. It is preferable, however, that the sheet or film be also stretchable, for the below reasons, such as an olefin film, e.g. polyethylene or polypropylene, or a polyvinyl chloride film.

Thus, as described above, the outer mold part 1 has fiber layer 2 disposed thereon, and flexible outer mold part 19 is applied over fiber layer 2 so as to form a mold cavity between mold parts 1 and 19, with the fiber layer disposed within that mold cavity. The fiber layer, of course, separates the two mold parts and, in this sense, functions as the mold definition element in the molding. With this arrangement, a liquid, hardenable synthetic resin is flowed into the mold cavity (formed by mold parts 1 and 19) through one or more openings 6, e.g. ducts, in the mold parts, as illustrated in FIG. 1. The flowing of the resin is continued until the mold cavity is at least substantially filled, although, as practiced in the prior art, the resin may be flowed until the mold cavity overspills, which will allow some removal of air trapped within the mold cavity and the fiber layer. This is, however, not necessary with the present invention.

Any of the conventional liquid, hardenable resins may be used, such as epoxy resins, polyester resins, vinylester resins, and the like, and the particular resin will be chosen depending upon the molding involved, the strength required, and the economics of the molding. The resins are normally formulated with appropriate curing agents, driers, extenders, solvents, and the like, all of which is well known in the art and need not be described herein. However, the resin is, preferably, a room-temperature hardenable resin. This means that the resin should be hardenable at a temperature of greater than 15° C., and more usually between a temperature of 15° C. to 30° C.

A reduced pressure is induced within the mold cavity formed by inner mold part 1 and flexible outer mold part 19 by means of at least one vent 18 (see FIG. 2) disposed in one of the mold parts 1 and 19 or therebetween. Vent 18 may take the form of a conventional air extraction channel, as shown in FIG. 2, which is composed of a hollow beam 15 with a mesh material 16 to prevent escape of solid matter and retain the resin in the mold cavity. Preferably, the inner and outer mold parts, as shown in FIG. 1, form a circumferential juncture and the vents are circumferentially disposed in that juncture. FIG. 1 shows two vents 18 at the bottom juncture and the top juncture of the mold parts.

The vents 18 are connected to a vacuum source. The vacuum source must be sufficient to cause the flexible outer mold part 19 to be tightly drawn against the fiber layer 2 and toward inner mold part 1 (which compressed fiber layer 2), air to be removed from the resin, mold cavity and fiber layer, and to cause the resin to flow into the fiber layer and mold cavity. The present vacuum should be capable of causing the outer mold part to draw so tightly toward inner mold part 1 that fiber layer 2 is considerably compressed, e.g. such that the resulting fiber/resin ratio is at least 50:50, preferably at least 60:40 and more preferably 65 to 75:35 to 25. The vacuum to achieve this result will vary with the fibers, resin, form of fibers and form of resin, but, for example, a vacuum of about 0.2 bar, and more usually between about 0.3 and 0.4 bar or more, is usually satisfactory. This will cause flexible outer mold part 19 to be tightly drawn against fiber layer 2, allow substantial amounts of air entrained in the resin or disposed in the mold cavity or fiber layer to be withdrawn from the mold cavity, compress the fiber layer and provide the present high fiber/resin ratios. This substantially reduces the number of voids in the molding and, consequently, the number of potential weak portions in the molding and substantially increases the strength of the molding. Higher vacuums, e.g. about 0.5 bar, may be used, but are not generally necessary. Higher vacuums will more normally be used when fiber layer 2 is quite thick, e.g. 3 or 4 cm thick, and the higher vacuum is used to considerably compress that thicker fiber layer to a much thinner compressed fiber layer.

The resin is continued in flowing into the mold cavity until the mold cavity is substantially filled with resin and thereafter the resin flow is stopped. With the combination of the resin flowing in the mold cavity, preferably from a plurality of openings 6, the continued use of the reduced pressure, and the collapsing of outer mold part 19 against the fiber layer 2, a much more uniform flow of resin will be achieved within fiber layer 2, and at the same time, air trapped within the mold cavity, the fiber layer and the resin will be displaced therefrom and moved out of the mold, so as to substantially avoid potential weak portions which often occurred with the prior art molding techniques.

The vacuum is maintained, with the resulting reduced pressure in the mold cavity, until the resin has sufficiently hardened so as to be shape sustaining. As can be appreciated, with the vacuum pulling outer mold part 19 inwardly against the fiber layer to provide the mold definition, in combination with the outer part, it is necessary to maintain that vacuum in order to maintain the mold definition until the resin has hardened. Depending upon the resin, the vacuum is maintained for at least about one hour, and more usually about three hours, although for some resins, it is necessary to maintain that vacuum for at least about seven hours, and up to about twelve to fifteen hours or longer.

After the resin has hardened to a shape sustaining form, the vacuum may be discontinued and outer mold part 19 may be removed and, indeed, the molding itself may be removed from inner mold part 1, although normally, the molding will remain on inner molding part 1 until the resin is fully hardened or cured, or at least substantially fully hardened or cured. For some resins, this may take from 12 to 24 hours or even longer.

As will be appreciated from the above, the collapsing of flexible outer mold part 19 will cause the resin flowing in the fiber layer and the fiber layer to be squeezed as the reduced pressure is applied. That squeezing of the resin and the fiber layer will cause a much more uniformed distribution of the resin in the fiber layer, far more removal of entrapped air and a higher fiber/resin ratio than was possible with the prior art molding technique of using two rigid mold parts. This effect can be further accentuated if a plurality of vents 18 are disposed along the mold parts or junctures thereof which will cause squeezing in a number of directions. Also, this effect can be accentuated when the vacuum is sequentially applied from lower vents to higher vents. This will cause the squeezing to commence at lower parts of the mold cavity and continue upwardly, with the flow of the resin, to upper parts of the mold cavity, and such sequential squeezing will cause the resin to be even more uniformly distributed in the fiber layer and will expel even more air from the mold cavity, resin and fiber layer.

Thus, the present molding method provides a substantial advance over the prior art in that it is not only far more economical by virtue of the inner mold part not having to be a preformed rigid part, but in that it provides a more uniform distribution of resin in the fiber layer, removes more air from the molding and results in a more favorable fiber/resin ratio.

In the parent application, additional provisions are disclosed for achieving even better resin distribution in the fiber layer. As disclosed in the parent application, foamed cores, e.g. foamed cores 3, 4 and 5 are applied to a fiber layer 2, although a different number of cores may be provided, depending on the size and/or the form of the moldings to be manufactured. In each foam core 3, 4, 5, an opening 6 is provided. The foam cores 3, 4, 5, are applied to fiber layer 2 and onto the assembly thus formed, a second fiber layer 7 is applied and onto fiber layer 7 a plurality of foam strips 8 (also see FIG. 4) are applied. The foam strips 8 extend transversely to the foam cores (also see FIG. 4) and on the side proximal to the fiber layers 2 and 7, the foam strips have passageways 9 (see FIG. 3B) for allowing more uniform resin flow and air to be more readily extracted from the mold cavity and the liquid resin. The foam cores 3, 4, 5 may also serve as longitudinal support ribs for the boat hull.

As schematically shown in FIG. 1, the openings 6 provided in the foam cores 3, 4, 5, are connected to a storage tank of liquid resin (not shown) via schematically shown ducts 11, 12 and 13. Onto the outer second fiber layer 7 and the foam strips 8, the flexible outer mold part 19 is applied. The various layers within the mold cavities are connected and sealed at sealing edges 10 in a simple manner by a plurality of clamps 20. Inwards, relative to the sealing edges thus formed and around the molding, a hollow beam 15 is provided (see FIG. 2) with the side proximal to the mold cavity being covered by mesh material 16 and the opposite side of the beam 15 is connected to a plurality of vents 18, which communicate with the vacuum source. Of course, a plurality of hollow beams 15, each communicating with the mold cavity, may be provided, and each having a corresponding opening in the outer mold part or the inner mold part or the junction therebetween, or in communication a tube being mounted outside of a mold part (not shown).

As shown in FIG. 4, which is a perspective view on an enlarged scale of the arrangement of FIGS. 1-3, the passageway (see FIG. 3B) of one of the foam strips 8 is closed tight by pressing, e.g. with the hand or thumb, at the end thereof, as indicated by arrow P. This closing will be made when the mold cavity is filled completely and the resin has gone to the end of foam strip 8. When the flexible outer mold part 19 is a clear or translucent film or foil, the operator of the process can easily follow the flow of the resin, and pinch off the end of strip 8, when appropriate.

Figure 5:
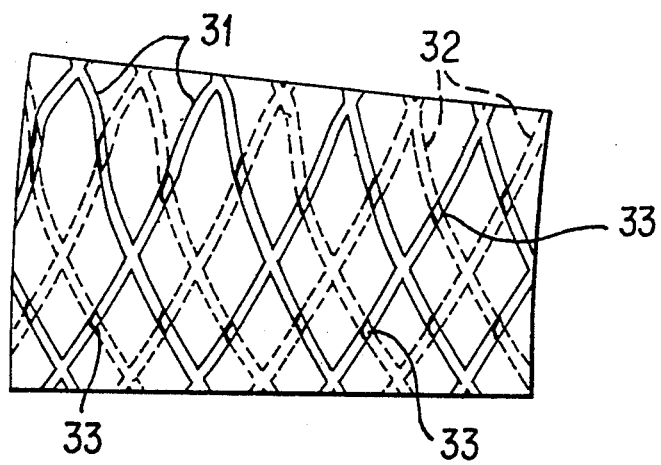
FIG. 5 is a top view of a portion of a preferred core which may be used in lieu of the core of FIG. 4.
Figure 6:
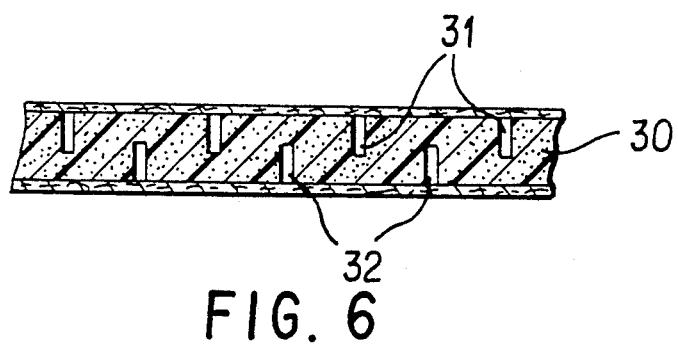
FIG. 6 is a cross-sectional view of FIG. 5.

While this arrangement provides even more controlled and uniform distribution of resin in connection with the above broader aspect of the invention, as a second aspect of the present invention, an improved resin distribution system is provided. Thus, in lieu of or in combination with the cores and strips, described above, a multi-channel elongated core is applied to a fiber layer 2 (one or more of a plurality of fiber layers) with the multi-channeled core extending at least along substantially the entire length of the molding in the longitudinal direction. The core 30, as shown in FIGS. 5 and 6, has a plurality of interconnecting channels 31 on at least one side thereof such that resin flowing in the channels flows in substantially both the longitudinal and transverse directions of the core. The interconnecting channels may be a pattern of shaped channels such as ovals, circles, squares, rectangles, triangles and diamond shapes, with a generally diamond shape being shown in FIG. 5, which is a preferred embodiment.

As an alternate preferred embodiment, the pattern of shaped channels 31 is formed on both sides of the core, with the pattern of shaped channels 31 on one side being offset from the pattern of shaped channels 32 on the other side, as shown in FIGS. 5 and 6. When the pattern of channels extend in depth into the core a distance equal to at least more than one half the thickness of the core, the pattern of channels 31 on one side of the core crosses with the pattern of channels 32 on the other side of the core, and hence openings 33 between the two patterns of channels on each side are provided. This provides even greater uniformity of distribution of the resin.

Figure 7:
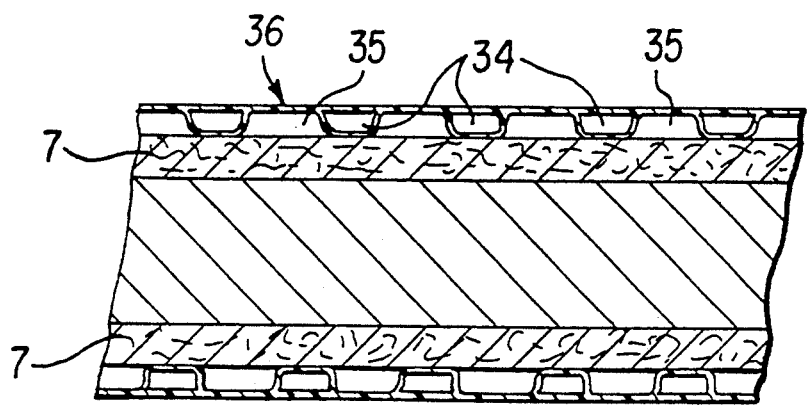
FIG. 7 is a cross-sectional view of a molding using an alternate core material for achieving uniform flow of resin in the molding.

In lieu of a sandwich core as described in FIGS. 5 and 6, the core may be a conventional plastic bubble film 36, as shown in FIG. 7. That bubble film 36 has upstanding bubbles 34 spaced on at least one surface of the film and the interstices 35 between the bubbles forms the multichannels described above. The bubble film is conventional material which is commercially available and need not be described in detail herein, for sake of conciseness. Bubble film of this nature is often used as a packaging material, e.g. a cushioning material, or as swimming pool covers, and consists of two plastic films, e.g. olefin films or vinyl films, laminated together with air bubbles between the two films. The air bubbles, generally, substantially cover the laminate, with land areas between the bubbles, which form the present interstices and multi-channels.

The bubble film is placed between the outer mold part 19 and the next adjacent layer 7, as shown in FIG. 1. The bubble film may have bubbles on both sides thereof, so as to provide interstices on both sides of a bubble film. If the bubble film is made with the required properties, as described above, it may be used as outer mold part 19.

In the case of the embodiment shown in FIGS. 5 and 6, preferably, the core is a foamed plastic with a plurality of channels formed in at least one side thereof. However, in order that the channels 31 and 32 not be collapsed, during the reduced pressure step, it is preferred that the foamed plastic is at least a semi-rigid foamed plastic, i.e. one which will not collapse under the reduced pressure, and such foamed plastic may be foamed polyvinyl chloride.

The embodiments of FIGS. 5, 6 and 7 may be used in lieu of the foamed cores 3, 4 and 5 in FIG. 1, or they may be used in addition thereto, by extending the cores beyond that shown in FIG. 1 so that the cores cover a substantial portion of either inner mold part 1 or fiber layer 2, e.g. 20 to 30 percent or even 40 to 70 percent thereof or more.

Also, when the embodiments of FIGS. 5 through 7 are used in lieu of the foamed cores shown in FIG. 1, the strips 8, shown in FIGS. 3B and 4 may be used therewith. Thus, in that embodiment, a plurality of the strips 8 having longitudinal passageways 9 therein are applied over a fiber layer in a direction substantially transverse to the longitudinal direction of the cores shown in FIGS. 5 through 7, with the strips extending toward edges of the fiber layer, similar to that shown in FIG. 4, with the exception that the core 4 is configured in the manner of FIGS. 5 through 7.

The cores, however, may be made of a non-foamed, rigid material, such as wood or metal. Such rigid materials serve as stiffening members in the molding, e.g. a boat hull, and will stiffen the molding to at least the square of the added thickness of the core. Especially when such rigid cores are used, it is preferable that the outer mold part 19 is a stretchable sheet or film, e.g. stretchable by 5-300%, such as an olefin film, so as to form around such rigid cores and uniformly compress fiber layer 2.

Thus, it will be most apparent that by using the molding technique of the broader aspect of the invention as described above, and particularly with the cores and strips disclosed in detail in the parent application, and more preferably with the cores shown in FIGS. 5 through 7, much improved resin distribution in the fiber layer can be achieved, along with a much greater expulsion of air from the resin, mold cavity and fiber layers and with a very substantial increase in the fiber/resin ratio. All of this is achieved with a much more economical molding system, so that the large-sized moldings can be produced in better quality at lower costs. Thus, the invention provides a very substantial advance in the art.

While the invention has been described in regard to specific embodiments, it is apparent that the invention is not limited to these specific embodiments and extends to the spirit and scope of the annexed claims.

What is claimed is:

1. In a method of manufacturing a large-sized, thin walled, elongated molding of fiber reinforced, hardenable synthetic resin, wherein at least one layer of reinforcing fiber is laid against a form-retaining, rigid inner mold part such that the fiber layer is substantially co-extensive with the inner mold part, an outer mold part is placed against the fiber layer so as to form a mold cavity between the mold parts with the fiber layer disposed within the mold cavity, a liquid, hardenable synthetic resin is flowed into the mold cavity through one or more openings in at least one of the mold parts to at least substantially fill the mold cavity, and a reduced pressure is induced within the mold cavity by means of at least one vent communicating with the mold cavity in at least one of the mold parts being connected to a vacuum source sufficient to remove air from the mold cavity, the improvement comprising:
   (1) placing a non-form-retaining, flexible outer mold part against said fiber layer, which outer mold part is a flexible film;
   (2) applying at least one multi-cannelled elongated core to said fiber layer, with the core extending at least along substantially the entire length of the molding in the longitudinal direction, said core having a plurality of interconnected channels on at least one side thereof;
   (3) flowing the liquid, hardenable resin into the mold cavity such that resin flows in said channels in substantially both the longitudinal and transverse directions of said core;
   (4) connecting the said at least one vent to a vacuum source to provide a vacuum sufficient to cause said flexible outer mold part to be tightly drawn against said fiber layer and toward said inner mold part, air to be removed from within the resin, mold cavity and fiber layer, wherein said resin is caused to flow into said fiber layer and mold cavity and a high fiber-to-resin content molding is produced;
   (5) substantially filling said mold cavity with said resin and stopping the flow of resin; and,
   (6) maintaining said vacuum through said vent until said resin has sufficiently hardened as to be shape sustaining.

2. The method of claim 1 wherein the molding is a boat hull or a windmill rotor blade.

3. The method of claim 2 wherein the molding is at least 3 meters in one direction.

4. The method of claim 1 wherein the resin is a room-temperature hardenable resin.

5. The method of claim 4 wherein the resin is hardenable at temperatures between about 15° C. and 30° C.

6. The method of claim 1 wherein the fibers are selected from the groups consisting of glass fibers, plastic fibers and carbon fibers.

7. The method of claim 1 wherein the resin is selected from the group consisting of epoxy resins, polyester resins and vinylester resins.

8. The method of claim 1 wherein the fiber layer is at least in part a non-woven matt or unidirectional roving of fibers.

9. The method of claim 1 wherein the fiber layer is at least in part a woven fabric of fibers.

10. The method of claim 1 wherein the fiber layer is at least 1 mm thick in an uncompressed form thereof.

11. The method of claim 1 wherein the vacuum is sufficient to provide a fiber/resin ratio of at least 50:50.

12. The method of claim 1 wherein the vacuum is sufficient to provide a fiber/resin ratio of at least 60:40.

13. The method of claim 1 wherein the film is made of stretchable material.

14. The method of claim 1 wherein said vacuum is maintained for at least three hours.

15. The method of claim 14 wherein the vacuum is maintained for at least seven hours.

16. The method of claim 1 wherein the inner and outer mold parts form a circumferential juncture and a plurality of said vents are circumferentially disposed in said juncture.

17. The method of claim 1 wherein a plurality of said fiber layers are placed against said inner mold part.

18. The method of claim 1 wherein the core is a plastic bubble film having upstanding bubbles on at least one side thereof, and the interstices between the bubbles form multi-channels.

19. The method of claim 18 wherein the bubble film is placed between said outer flexible mold part and the next adjacent fiber layer.

20. The method of claim 18 wherein the bubble film is the outer mold part with upstanding bubbles at least on the side thereof adjacent the fiber layer.

21. The method of claim 20 wherein the bubble film is an olefin or vinyl film.

22. The method of claim 1 wherein the core is a plastic or wood.

23. The method of claim 22 wherein the core is a foamed plastic which is non-permeable such that resin may flow through said channels and into said mold cavity and fiber layer.

24. The method of claim 22 wherein the core has a pattern of shaped channels formed on both sides thereof, with the pattern on one side being offset from the pattern on the other side, said channels extending in depth into the core a distance equal to at least more than one-half the thickness of the core so that where the pattern on one side crosses with the pattern on the other side, openings between the patterns on each side are provided.

25. The method of claim 24 wherein the pattern is selected from the group consisting of ovals, circles, squares, rectangles, triangles and diamond shapes.

26. The method of claim 25 wherein the pattern is diamond shaped.

27. The method of claim 24 wherein the core is a foamed plastic.

28. The method of claim 27 wherein the foamed plastic is polyvinyl chloride foam.

29. The method of claim 1 wherein a plurality of strips having longitudinal passageways therein are applied over a fiber layer in a direction substantially transverse to the longitudinal direction of the core, with the strips extending toward edges of the fiber layer.

* * * * *